United States Patent [19]

Volmer et al.

[11] 4,212,847
[45] Jul. 15, 1980

[54] APPARATUS FOR CARRYING OUT POLYMERIZATIONS FROM THE GAS PHASE

[75] Inventors: Dieter Volmer, Wesseling; Juergen Schwind, Meschenich; Erich Kolk; Hans Frielingsdorf, both of Bad Duerkheim, all of Fed. Rep. of Germany

[73] Assignee: BASF Aktiengesellschaft, Fed. Rep. of Germany

[21] Appl. No.: 888,926

[22] Filed: Mar. 22, 1978

[30] Foreign Application Priority Data

Apr. 2, 1977 [DE] Fed. Rep. of Germany ....... 2714812

[51] Int. Cl.² .......................... B01J 1/00; B01J 3/00; C08F 10/00
[52] U.S. Cl. ................................ 422/135; 366/310; 366/319; 422/226; 422/229; 526/88
[58] Field of Search .................... 23/285, 289, 290; 366/309, 310, 318, 319; 422/131, 135, 137, 225, 226, 229; 526/64, 86, 87, 88

[56] References Cited

U.S. PATENT DOCUMENTS

| 1,585,169 | 5/1926 | Perkins et al. ............... 366/319 X |
| 2,651,582 | 9/1953 | Courtney ....................... 366/309X |
| 3,061,281 | 10/1962 | Phelan et al. ................. 366/319 X |
| 3,407,179 | 10/1968 | Carr ................................ 422/131 X |
| 3,799,917 | 3/1974 | Rathke ............................ 23/285 X |
| 3,842,055 | 10/1974 | Gabriel et al. ................. 422/135 X |
| 3,877,881 | 4/1975 | Ono et al. ....................... 23/285 |
| 3,944,534 | 3/1976 | Sennari et al. ................. 23/285 X |

FOREIGN PATENT DOCUMENTS

| 1218265 | 6/1966 | Fed. Rep. of Germany ............ 23/289 |
| 328703 | 1/1903 | France ....................................... 366/309 |

Primary Examiner—Joseph Scovronek
Assistant Examiner—Roger F. Phillips
Attorney, Agent, or Firm—Keil & Witherspoon

[57] ABSTRACT

An apparatus for carrying out polymerizations from the gas phase comprising a sealable reactor with a spiral stirrer which is rotatable in the reactor about a vertical axis to generate circulatory streams of the materials employed, in which the stirrer rotating within the reactor is surmounted by a stirrer rod, which extends upward beyond the uppermost flight circle of the stirrer and is attached to the stirrer at a certain distance from the axis of the stirrer, the distance of the side face of the stirrer rod from the reactor wall is at least 10 mm, and the surface of revolution of the moving rod matches the contour of the reactor in this zone.

4 Claims, 1 Drawing Figure

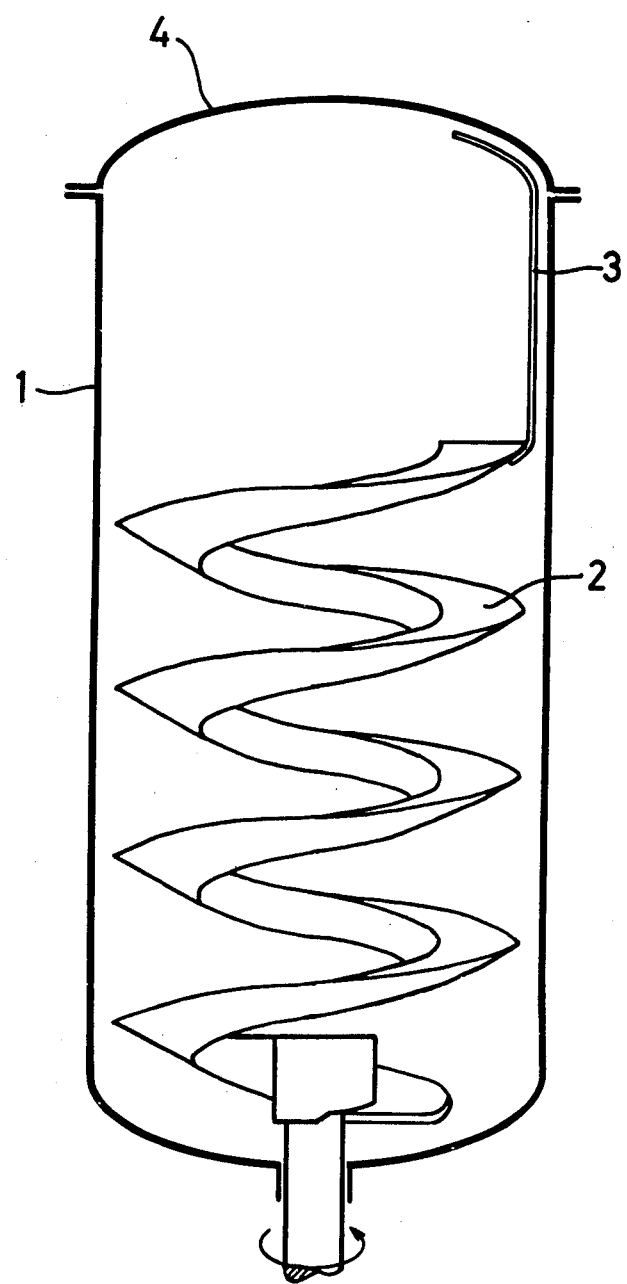

APPARATUS FOR CARRYING OUT POLYMERIZATIONS FROM THE GAS PHASE

The present invention relates to apparatus for carrying out polymerizations from the gase phase comprising a sealable reactor with a spiral stirrer which is rotatable in the reactor about a vertical axis to generate circulatory streams of the materials employed, which stirrer acts within the stirred bed of solid, and in particular relates to supplementary stirring elements, the action of which extends into the upper gas space.

In recent processes, the polymerization of ethylenically unsaturated monomers is carried out from the gas phase of the monomers. The reaction vessels used are cylindrical autoclaves, the bottoms and lids of which may be constructed in different shapes, for example basket-shaped or dished and in special cases may even have completely or partially plane surfaces. The polymerization takes place in a stirred bed of solid, consisting of polymer grit, in which a very small amount of catalyst is dispersed. The geometrical cross-sectional shape of this bed of solid determined on the one hand by the geometry of the reactor and of the stirrer used and on the other hand by the stirrer speed and by the physical properties of the polymer, especially the bulk density and the particle size distribution. In order to achieve the stirring action required for thermal homogeneity, special stirrer elements of various construction are employed, for example spiral stirrers as described in German Pat. No. 1,218,265. When these stirrers are driven from the reactor bottom, they only extend over a certain, albeit maximum, axial zone of the essentially cylindrical reactor space. Accordingly, the surface of the stirred bed forms the interface with the gas space above it. The geometrical shape of the surface of the stirred bed not only depends on the above parameters but also on the flow of polymer particles produced by the stirrer. If the spiral stirrer is immersed, the rotational motion of the stirred solid forms a vortex on the surface of the material being stirred. The main transport direction under these conditions is along the middle axis of the cylindrical reactor volume, toward the bottom of the reactor. For other technological reasons, for example the degree of utilization of the reactor, the mixing time of the stirred bed and the possible need to limit the amount of cooling gas used to avoid fluidizing the product, it is not possible to operate the spiral stirrer under other than immersed conditions. As a result, during the reaction there is always a layer of stirred material, of a certain thickness, above the upper peripheral flying circle of the stirrer, which zone is generally referred to as the hold-up. This hold-up is, from a mixing point of view, an inadequately stirred zone since, due to its closeness to the reactor wall, it is only subject to the rotary motion of the product. The hold-up therefore allows the formation of polymer growths on the reactor wall and as the polymerization time increases these can interfere with homogeneous mixing of the stirred bed, for example due to lumps dropping off, and can cause mechanical damage of measuring and control equipment in the reactor and ultimately make it necessary to stop the polymerization.

Similar phenomena have been observed with suspension polymerizations in accordance with German Laid-Open Application DOS No. 2,032,700 or dispersion polymerizations according to German Pat. No. 1,557,021. To overcome such problems it has hitherto been proposed to convert the rotary motion of an outer upper vortex edge into a turbulent motion by means of baffles, flow guide plates, guide-vane systems and similar elements attached to the reactor wall. On the other hand German Pat. No. 380,024, U.S. Pat. No. 1,585,169, German Pat. No. 657,302 and German Published Application DAS No. 1,213,386 have already disclosed, without reference to any polymerization reaction, special arrangements of stirrer elements which achieve better mixing of the contents of a vessel, in the upper zone of its volume, by means of guide plates, flow breakers or mixing vanes. A feature common to the last-mentioned devices is that they are attached either to the wall or to the lid of the vessel and are rotatable and adjustable in height, or that the angle at which they are set to the vertical axis is adjustable. With these conventional arrangements of flow breakers, there are always dead zones, and zones of varying turbulence, in the vicinity of the wall.

It is an object of the present invention so to modify the course of the polymerizations, by improving the stirrer elements, that the formation of polymer growths both on the reactor wall in the region of the hold-up above a spiral stirrer and on the upwardly adjoining part of the reactor wall, i.e. in the zone of the gas space, is prevented and accordingly trouble-free continuous polymerization is made possible over long periods.

We have found that this object is achieved, according to the invention, if the spiral stirrer rotating within the bed of solid is surmounted by a stirrer rod which extends upward beyond the uppermost flight circle of the stirrer, the surface of revolution of the moving rod matching the contour of the reactor in this zone. According to a further feature of the invention, the attached stirrer rod has an essentially rectangular cross-section of substantially smaller surface area than the cross-section of the spiral stirrer, the major axis of the cross-section of the stirrer rod being tangential to the wall of the reactor.

The drawing shows a reactor with a spiral stirrer driven from below. The reactor wall is marked 1 and the stirrer rotating within the reactor is marked 2. If, in accordance with the drawings, the reactor has an upper lid 4 with an arc-shaped curved cross-section, the stirrer rod 3 attached to the spiral stirrer 2 and projecting beyond the uppermost flight circle of the stirrer is a flat rod, the upper free end of which terminates at a certain distance from the lower boundary surface of the lid 4. When the combined stirrer element is operated, the boundary surface of the attached stirrer rod 3 moves over the inner cylindrical wall surface at a certain distance therefrom. The front edge of the attached stirrer rod 3 has a small or very small compression surface, in order to avoid polymer growths at this point also. The free end of the attached stirrer rod 3 substantially matches the contour of the lid 4.

As already explained above, inside the reactor the stirred solid executes rotary motions, also in a vertical direction, which motions result from the shape and cross-section profile of the spiral stirrer 2. The cross-section of the attached stirrer rod 3 should be such that in the zone of action of this rod no additional vertical flow components are generated in the vicinity of the wall (of the reactor). It follows that the cross-section of the attached stirrer rod is substantially smaller than that of the stirrer rotating within the regular bed of solid. Preferably, the cross-section of the stirrer rod 3 has an area which is at most 1/10, and preferably from 1/30 to 1/100, of the area of the cross-section of the spiral stirrer 2. In deciding the distance of the stirrer rod 3 from the wall surface, taking the speed of rotation into account, it is necessary to ensure that no rubbing or scraping action results. The side face of the stirrer rod which points toward the reactor wall should therefore be at a distance of at least 10 mm from the latter.

The distance of the center of the cross-section of the stirrer rod from the center of the stirrer axis is from 47 to 49% of the reactor diameter.

EXAMPLE

The gas phase polymerization of ethylene was carried out in a polymerization reactor having a dished bottom and a total capacity of 3 m$^3$. The reactor was charged with 900 kg of polyethylene grit. The single-flight spiral stirrer, having a diameter of 1,100 mm and a height of 1,900 mm, had a power consumption of 18 kW at a speed of 66 rpm. The dimensions of the steel bar stirrer attachment were: height h=600 mm, width b=40 mm, thickness c=6 mm. The distance of the stirrer attachment from the wall was 10 mm. The free end of the stirrer attachment matched the curvature of the reactor lid over a length of 100 mm. The continuous polymerization was carried out for 1,296 hours without any problem. After opening the reactor, no growth of polymer on the reactor wall was found.

COMPARATIVE EXAMPLE

The above procedure was followed, but without using the steel bar stirrer attachment.

Five hours after the start of the continuous polymerization, fist-sized catalyst-containing polymer lumps were encountered at the reactor discharge. Thirteen hours after the start of the reaction, the polymerization was stopped because the conditions had become uncontrollable. After opening the reactor, the formation of a massive, catalyst-containing, fused polymer ring in the region of the hold-up was found. The remaining stirred bed contained further catalyst-containing polymer lumps.

We claim:

1. Apparatus for carrying out polymerizations from the gas phase, comprising a sealable reactor with a spiral stirrer which is rotatable in the reactor about a vertical axis to generate circulatory streams of the materials employed, wherein the stirrer rotating within the reactor is surmounted by a stirrer rod, which extends upward beyond the uppermost flight circle of the stirrer and is attached to the stirrer at a distance from the axis of the stirrer which is from 47 to 49% of the reactor diameter, the distance of the side face of the stirrer rod from the reactor wall is at least 10 mm, so that no rubbing or scraping occurs between the stirrer rod and the reactor wall, and the surface of revolution of the moving rod matches the contour of the reactor in this zone.

2. Apparatus as claimed in claim 1, wherein the stirrer rod is of essentially rectangular cross-section, the major axis of the cross-section being tangential to the wall of the reactor.

3. Apparatus as claimed in claim 1, wherein the cross-section of the stirrer rod is substantially smaller than the cross-section of the spiral stirrer which moves within the reactor.

4. Apparatus as claimed in claim 1, wherein the front edge of the stirrer rod is profiled to offer a minimum compression surface.

* * * * *